US008238086B2

(12) United States Patent
Ou (10) Patent No.: US 8,238,086 B2
(45) Date of Patent: Aug. 7, 2012

(54) LOCKING ASSEMBLY, HANDHELD ELECTRONIC DEVICE AND HOLDER

(75) Inventor: Tsung-Yuan Ou, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 260 days.

(21) Appl. No.: 12/825,359

(22) Filed: Jun. 29, 2010

(65) Prior Publication Data

US 2011/0255219 A1    Oct. 20, 2011

(30) Foreign Application Priority Data

Apr. 20, 2010    (TW) .............................. 99112312 A (51) Int. Cl.
*H05K 5/00*    (2006.01)
*H05K 7/00*    (2006.01)
(52) U.S. Cl. .......... 361/679.21; 361/679.22; 361/679.58
(58) Field of Classification Search ............. 361/679.21, 361/679.22, 679.58
See application file for complete search history.

(56) References Cited

U.S. PATENT DOCUMENTS

| 5,201,858 | A | 4/1993 | Otrusina | |
|---|---|---|---|---|
| 5,274,885 | A | 1/1994 | Hellweg | |
| 6,343,006 | B1 * | 1/2002 | Moscovitch et al. | .... 361/679.04 |
| 6,449,143 | B2 * | 9/2002 | Rooyakkers et al. | .... 361/679.04 |
| 7,331,551 | B2 * | 2/2008 | Oddsen, Jr. | ................ 248/279.1 |
| 8,000,090 | B2 * | 8/2011 | Moscovitch | ............. 361/679.04 |
| 2003/0047575 | A1 | 3/2003 | Enkerlin et al. | |
| 2005/0164541 | A1 | 7/2005 | Joy et al. | |
| 2008/0035808 | A1 | 2/2008 | Rawlings et al. | |
| 2008/0259541 | A1 * | 10/2008 | Woodward et al. | ........... 361/681 |
| 2008/0296333 | A1 | 12/2008 | Brassard | |

OTHER PUBLICATIONS

"European Search Report of Europe Counterpart Application," Issued on Oct. 29, 2010, p. 1-p. 4.
"First Office Action of Europe Counterpart Applition," Issued on Dec. 3, 2010, p. 1-p. 6.

* cited by examiner

*Primary Examiner* — Anthony Haughton
(74) *Attorney, Agent, or Firm* — Jianq Chyun IP Office (57) ABSTRACT

A locking assembly including a first locking part on a first object and a second locking part on a second object is provided. The first locking part includes a head portion. The second locking part has an assembling opening and an assembling space behind the assembling opening. An area of a projection of the assembling space on a plane where the assembling opening is located is greater than and lies over the area of the assembling opening. The head portion of the first locking part is adapted to enter the assembling space through the assembling opening along an assembling direction, and then adapted to reach a locking position in the assembling space by moving along an engaging direction parallel to the surface.

23 Claims, 13 Drawing Sheets

LOCKING ASSEMBLY, HANDHELD ELECTRONIC DEVICE AND HOLDER

CROSS-REFERENCE TO RELATED APPLICATION

This application claims the priority benefit of Taiwan application serial no. 99112312, filed on Apr. 20, 2010. The entirety of the above-mentioned patent application is hereby incorporated by reference herein and made a part of this specification.

BACKGROUND OF THE INVENTION

1. Field of the Invention

The present application relates to a technique for joining a handheld electronic device and a holder together. More specifically, the present application relates to a locking assembly, and a handheld electronic device and a holder applying the locking assembly.

2. Description of Related Art

In order to meet the requirement of a light, thin and compact modern electronic device, all kinds of electronic elements have all developed toward a miniature size. As the function of the electronic products is more and more powerful and the volume becomes smaller and smaller, various handheld electronic devices are developing and have gradually replaced the large-scale electronic devices to be the mainstream product in the market.

Sometimes, the handheld electronic devices are installed on a holder for users to watch or operate the handheld electronic devices in the car. A conventional holder for carrying the handheld electronic device clamps the handheld electronic device by clampers, and thus the user requires both hands to align and join the handheld electronic device with the holder in an inconvenient operation.

On the other hand, since the conventional holder is incapable to provide a reliable and secure clamping effect, the handheld electronic device may drop from the holder when sustaining a vibration or an external force and be damaged.

SUMMARY OF THE INVENTION

The present application is directed to a reliable and stable locking assembly for joining two objects via simple and rapid installing process.

The present application is directed to a handheld electronic device adapted to be installed on a holder via the aforementioned locking assembly in a simple and rapid installing manner.

The present application is directed to a holder adapted to be joined with a handheld electronic device via the aforementioned locking assembly in a simple and rapid installing manner.

As embodied and broadly described herein, a locking assembly for joining a first object and a second object is provided. The locking assembly comprises a first locking part and a second locking part. The first locking part is located on the first object, and the first locking part comprises a head portion and a necking portion connected between the first object and the head portion. The second locking part is located on the second object, and the second locking part has an assembling opening and an assembling space behind the assembling opening. An area of a projection of the assembling space on a plane where the assembling opening is located is greater than and lies over the area of the assembling opening. The head portion of the first locking part is adapted to enter the assembling space through the assembling opening along an assembling direction and then reach a locking position in the assembling space by moving along an engaging direction parallel to the surface.

The present application provides a handheld electronic device suitable for being installed on a holder. The holder comprises a second locking part. The second locking part has an assembling opening and an assembling space behind the assembling opening. An area of a projection of the assembling space on a plane where the assembling opening is located is greater than and lies over the area of the assembling opening. The handheld electronic device comprises a first locking part disposed at a back side of the handheld electronic device. The first locking part comprises a head portion and a necking portion connected between the handheld electronic device and the head portion. The head portion of the first locking part is adapted to enter the assembling space of the second locking part through the assembling opening along an assembling direction and then reach a locking position in the assembling space by moving along an engaging direction parallel to the surface.

The present application further provides a holder suitable for carrying a handheld electronic device. The handheld electronic device comprises a first locking part disposed at a back side of the handheld electronic device, and the first locking part comprises a head portion and a necking portion connected between the handheld electronic device and the head portion. The holder comprises a second locking part. The second locking part has an assembling opening and an assembling space behind the assembling opening. An area of a projection of the assembling space on a plane where the assembling opening is located is greater than and lies over the area of the assembling opening. The head portion of the first locking part is adapted to enter the assembling space through the assembling opening along an assembling direction and then reach a locking position in the assembling space by moving along an engaging direction parallel to the surface.

As to the above, the present application provides an effective joining manner between the handheld electronic device and the holder by the locking assembly. Owing to a simple structure of the locking assembly, the handheld electronic device and be installed on the holder in a simple and rapid installing manner.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

The locking assembly of the present application is adapted to join any two applicable objects. Details of applying the locking assembly to bond a handheld electronic device with a holder are illustrated in the following embodiments, though the present application is not limited thereto. Two objects required to be joined in a similar manner may apply the locking assembly of the present application in any probable circumstance to achieve simple, rapid and reliable locking effect.

Figure 1A:
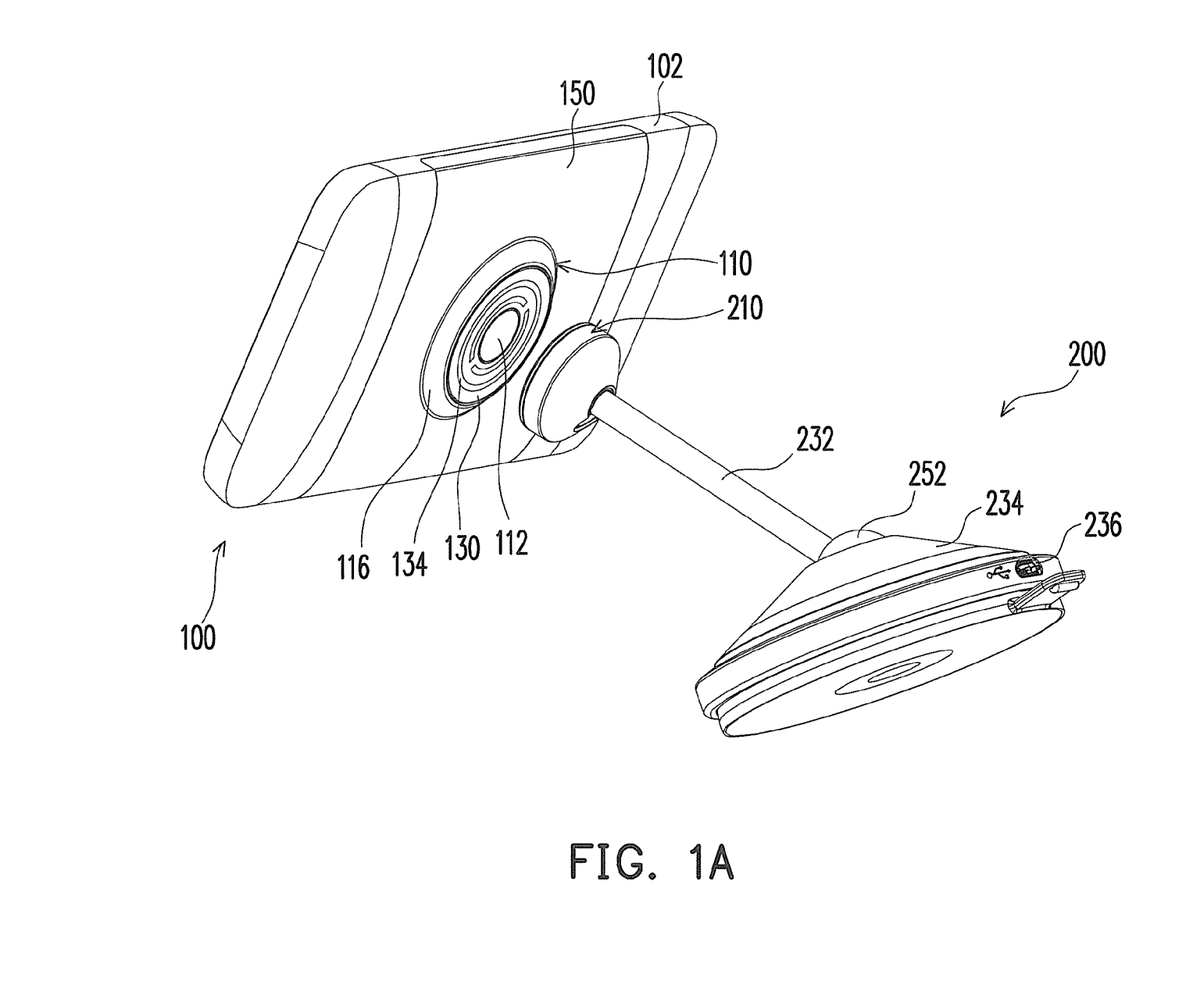
FIG. 1A is a perspective view showing a handheld electronic device and a holder for carrying the handheld electronic device according to an embodiment of the present invention.
Figure 1B:
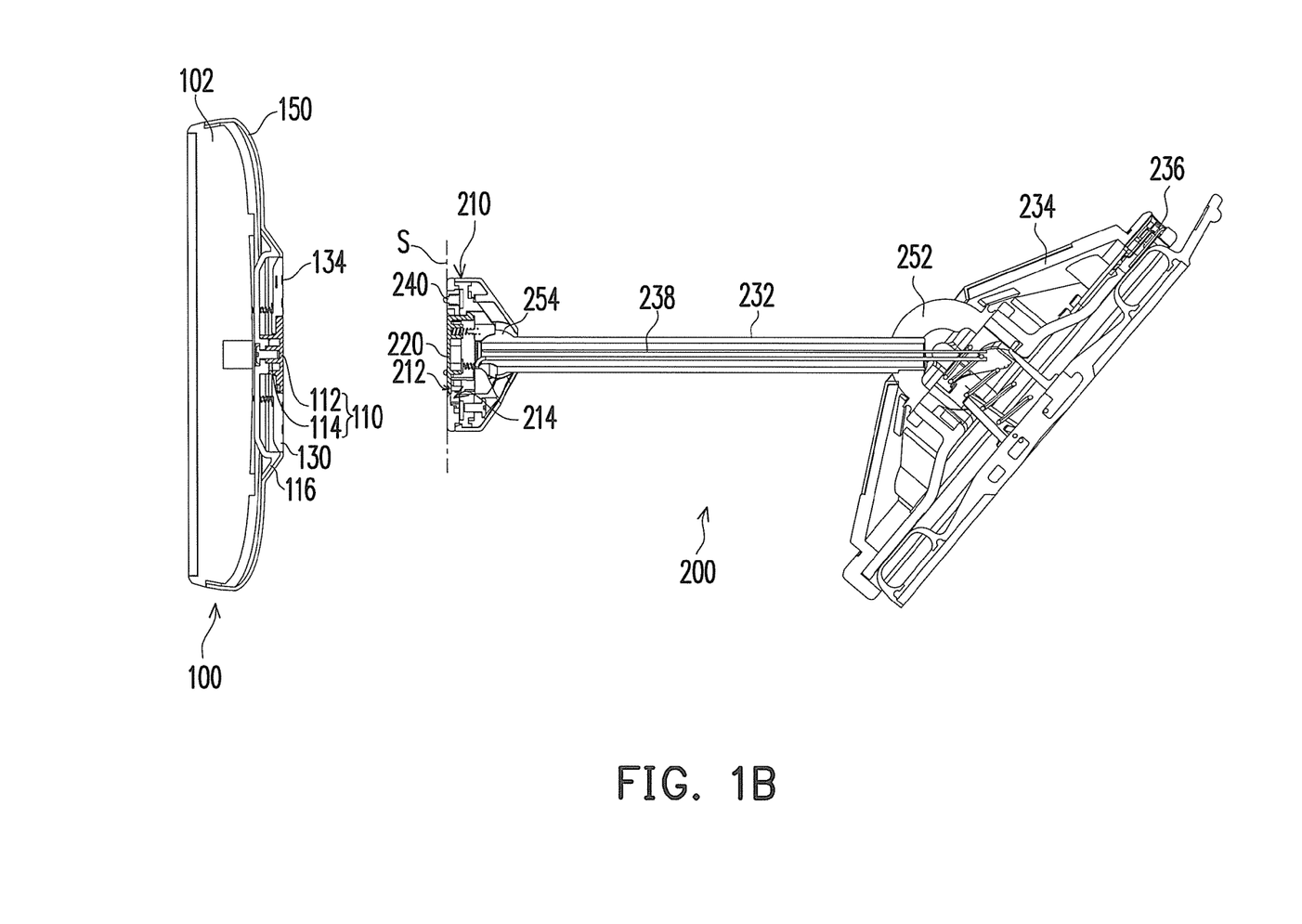
FIG. 1B is a schematic cross-sectional view of the structure of FIG. 1A.

FIG. 1A is a perspective view showing a handheld electronic device and a holder for carrying the handheld electronic device according to an embodiment of the present invention. FIG. 1B is a schematic cross-sectional view of the structure of FIG. 1A. The locking assembly includes a first locking part 110 on the handheld electronic 100 and a second locking part 210 of the holder 200. The first locking part 110 and the second locking part 210 can be joined together to lock the handheld electronic device 100 on the holder 200.

Figure 2:
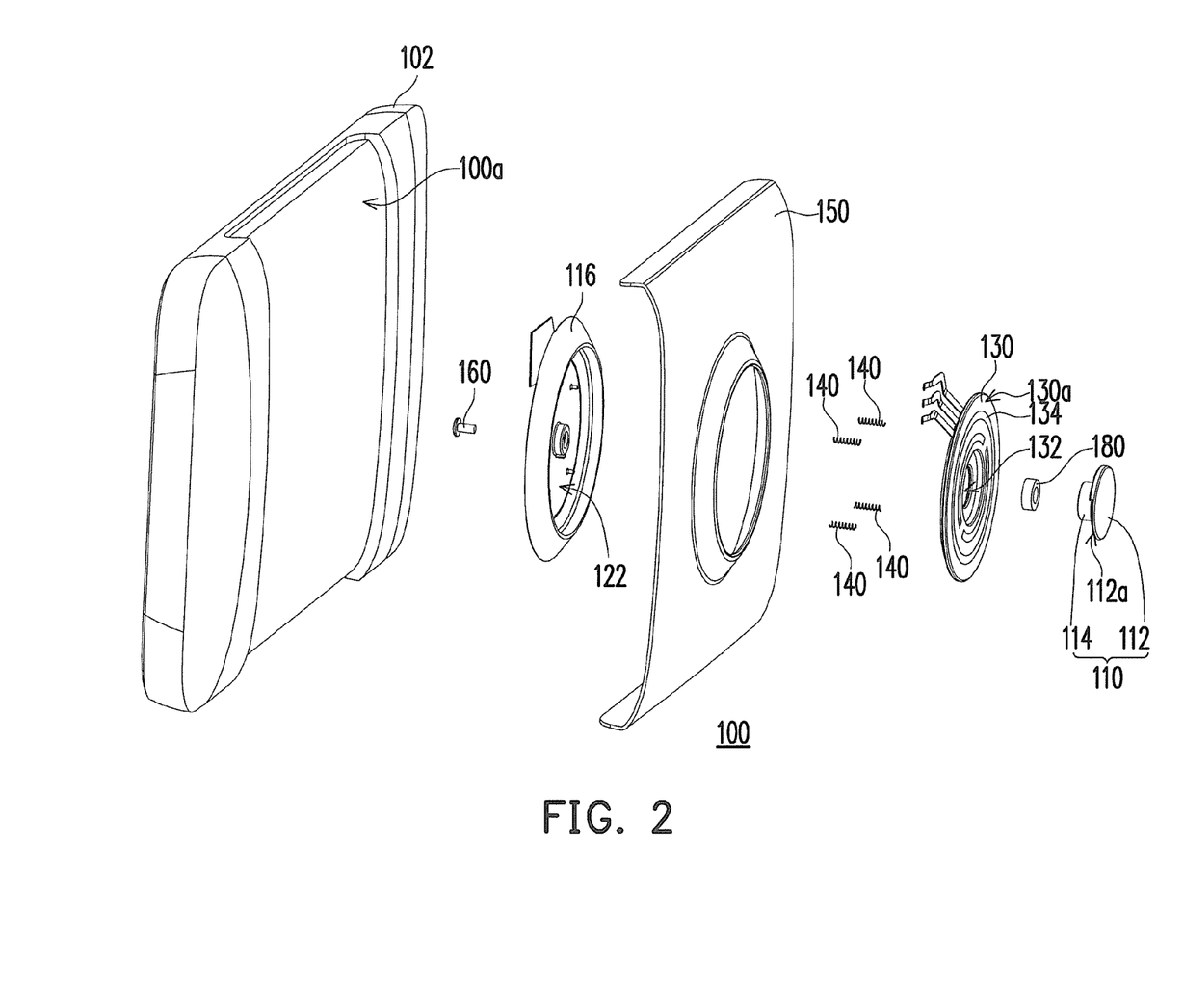
FIG. 2 is an exploded view of a handheld electronic device according to an embodiment of the present invention.

For a further illustration to the structure of the handheld electronic device 100, FIG. 2 shows an exploded view of the handheld electronic device 100 of the present embodiment. Referring to FIGS. 1A, 1B and 2, the first locking part 110 is disposed at a back side 100a of the handheld electronic device 100, and the first locking part 110 comprises a head portion 112 and a necking portion 114 connected between a main body 102 of the handheld electronic device and the head portion 112. Since the first locking part 110 is protrude from the back side 100a of the handheld electronic device 100, a decoration ring 116 is disposed in the periphery of the first locking part 110 to maintain the aesthetic appearance of the handheld electronic device 100. The decoration ring 116 surrounds the first locking part 110 to form an accommodating space 122. The first locking part 110 is located inside the accommodating space 122.

In addition, a movable first decoration plate 130 is disposed at an opening of the accommodating space 122, wherein the first decoration plate 130 has a through hole 132 exposing the head portion 112 of the first locking part 110. A first elastic component 140 is disposed between the main body 102 of the handheld electronic device 100 and the first decoration plate 130 so as to provide a returning force to the first decoration plate 130 in operation. In the present embodiment, the first elastic component 140 comprises a plurality of helical springs. In other embodiments, the first elastic component 140 may further be other equivalent components.

Moreover, in this embodiment, the handheld electronic device 100 may further comprise a shell 150 and screws 160, which are mounted on the main body 102 of the handheld electronic device 100 with the first locking part 110. However, the profiles and the assembling manners of the above components may vary with practical requirements and are not limited to those illustrated in the present embodiment.

Figure 3:
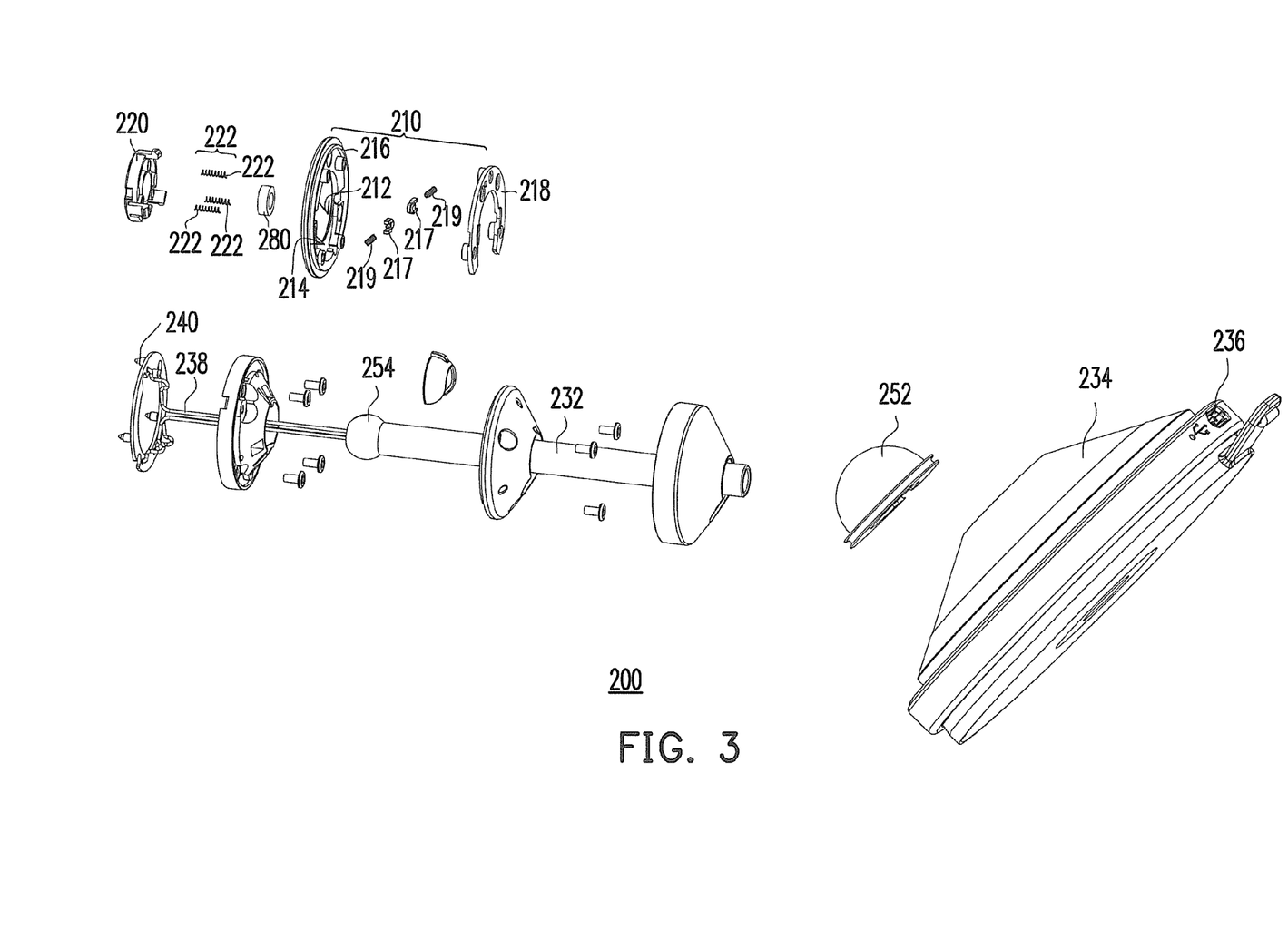
FIG. 3 is an exploded view of a holder according to an embodiment of the present invention.

For a further illustration to the structure of the holder 200, FIG. 3 shows an exploded view of the holder 200 of the present embodiment. Referring to FIGS. 1A, 1B and 3, the second locking part 210 is located at a front end of the holder 200, and the second locking part 210 has an assembling opening 212 and an assembling space 214 behind the assembling opening 212. An area of a projection of the assembling space 214 on a plane S (as shown in FIG. 1B) where the assembling opening 212 is located is greater than and lies over the area of the assembling opening 212. In other words, the assembling opening 212 is shrank relative to the assembling space 214, such that a displacement of the head portion 112 of the first locking part 110 parallel to an assembling direction is restricted thereby after the head portion 112 enters the assembling space 214 along the assembling direction.

More specifically, the second locking part 210 includes a first board 216 and a second board 218, wherein the first board 216 is provided with the aforementioned assembling opening 212 thereon, and the second board 218 is disposed in parallel with the first board 216 to form the assembling space 214. In addition, corresponding to the head portion 112 of the first locking part 110, a movable second decoration plate 220 is disposed at the assembling opening 212 of the second locking part 210, and a second elastic component 222 is disposed at a back side of the second decoration plate 220 so as to provide a returning force to the second decoration plate 220 in operation. In the present embodiment, the second elastic component 222 comprises a plurality of helical springs. In other embodiments, the second elastic component 222 may further be other equivalent components.

Furthermore, the second locking part 210 may further include two locating protrusions located on a side wall of the assembling space 214 for leaning and fixing the head portion 112 of the first locking part 110 when the head portion 112 enters the assembling space 214. In the present embodiment, the locating protrusions 217 are movably installed between the first board 216 and the second board 218. The second locking part 210 may further include a third elastic component 219 disposed between the locating protrusions 217 and the first board 216 or between the locating protrusions 217 and the second board 218 so as to provide a returning force to the locating protrusions 217 in operation.

In the present embodiment, the holder 200 may further include a shaft 232 and a base 234, which form the holder 200 together with the second locking part 210. The shaft 232 and the base 234 are connected with each other via a joint 252, and the shaft 232 is further connected to the second locking part 210 via another joint 254, such that the position of the handheld electronic device 100 can be adjusted in three-dimensional directions after the handheld electronic device 100 is installed on the holder 200. However, the holder 200 may further include screws or other components, while the profiles and the assembling manners of those unshown components may vary with practical requirements and are not limited to the present embodiment.

Figure 4A:
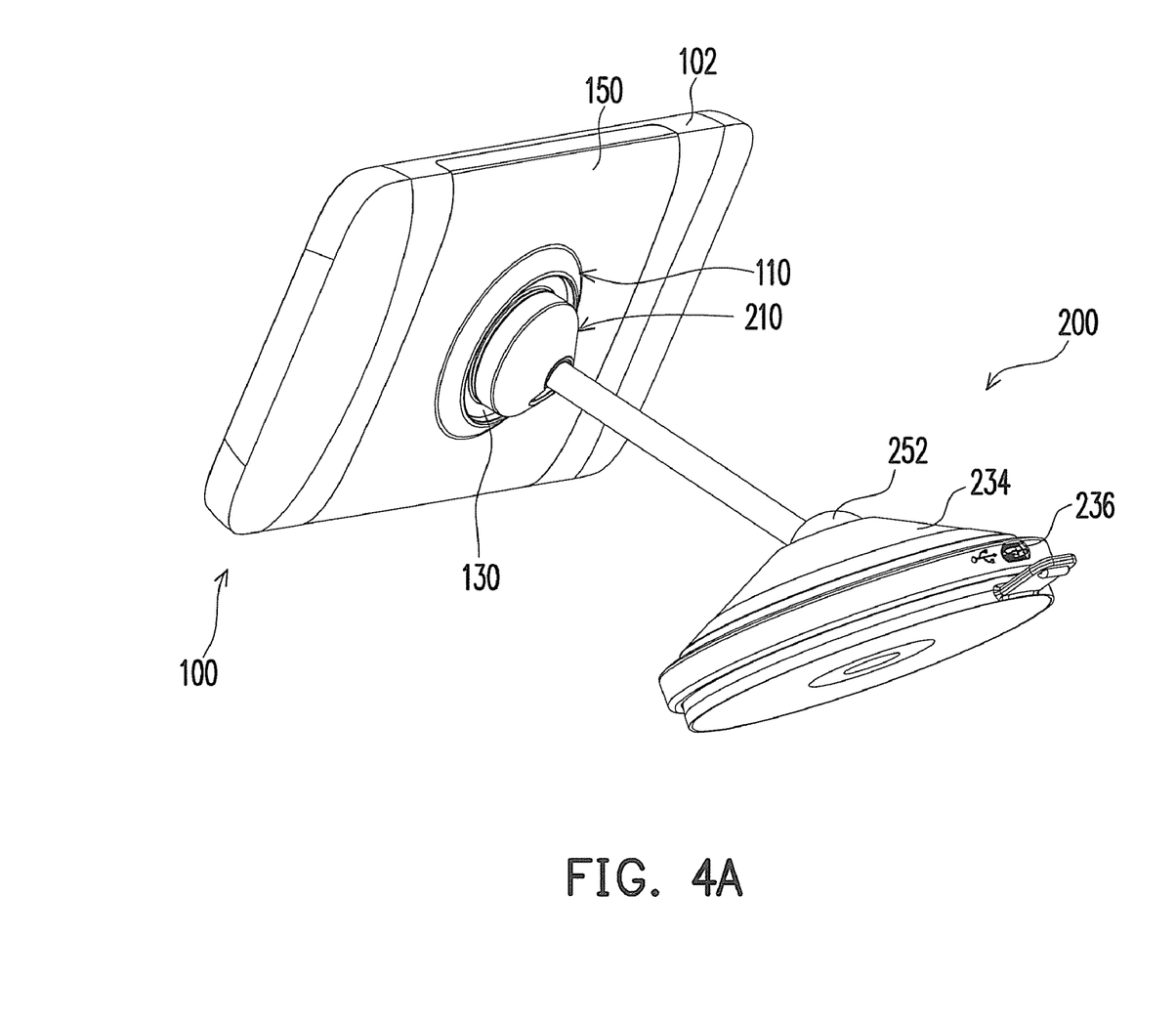
FIGS. 4 through 6 illustrate an assembling process of a handheld electronic device and a holder according to an embodiment of the present invention.
Figure 4B:
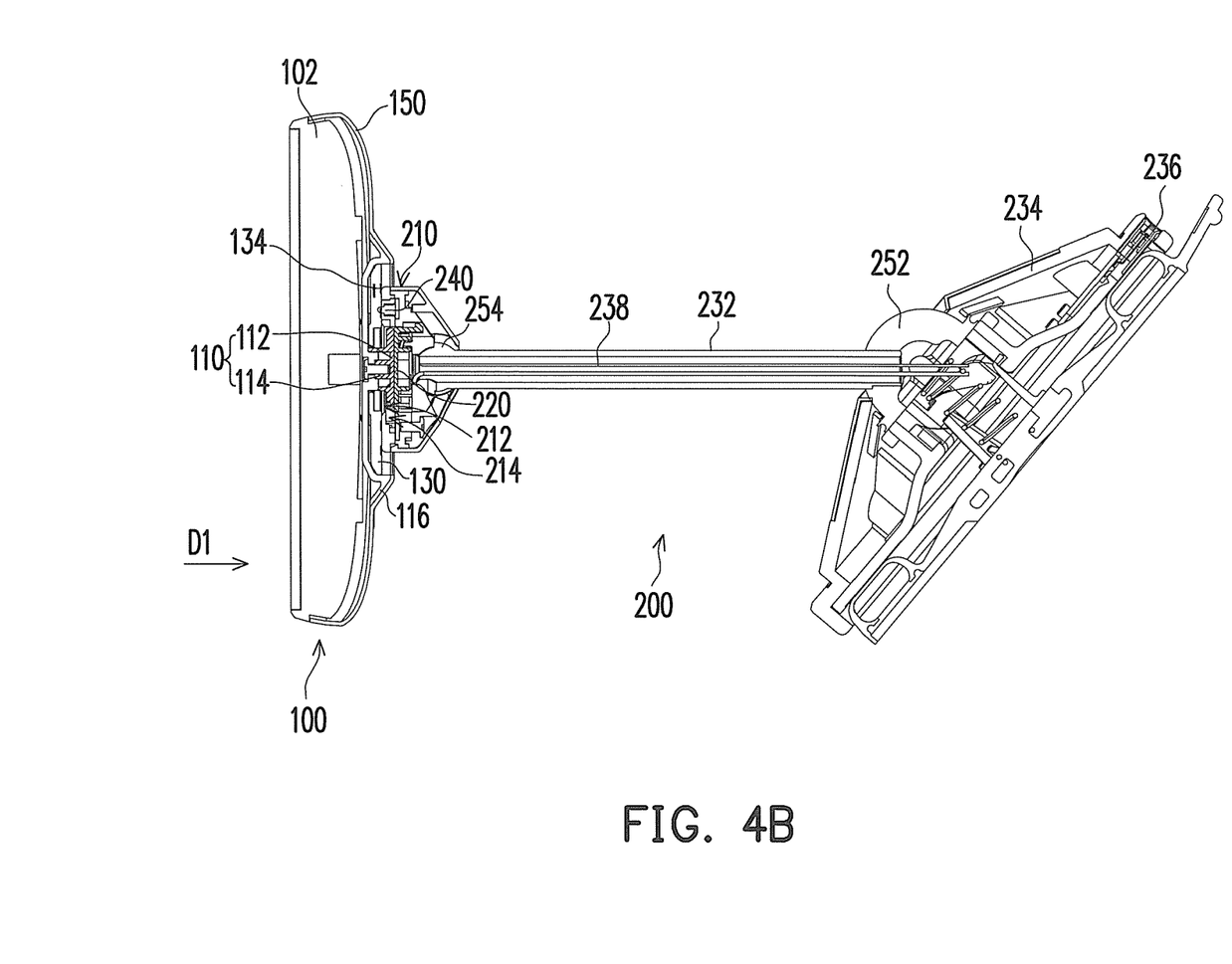
Figure 4C:
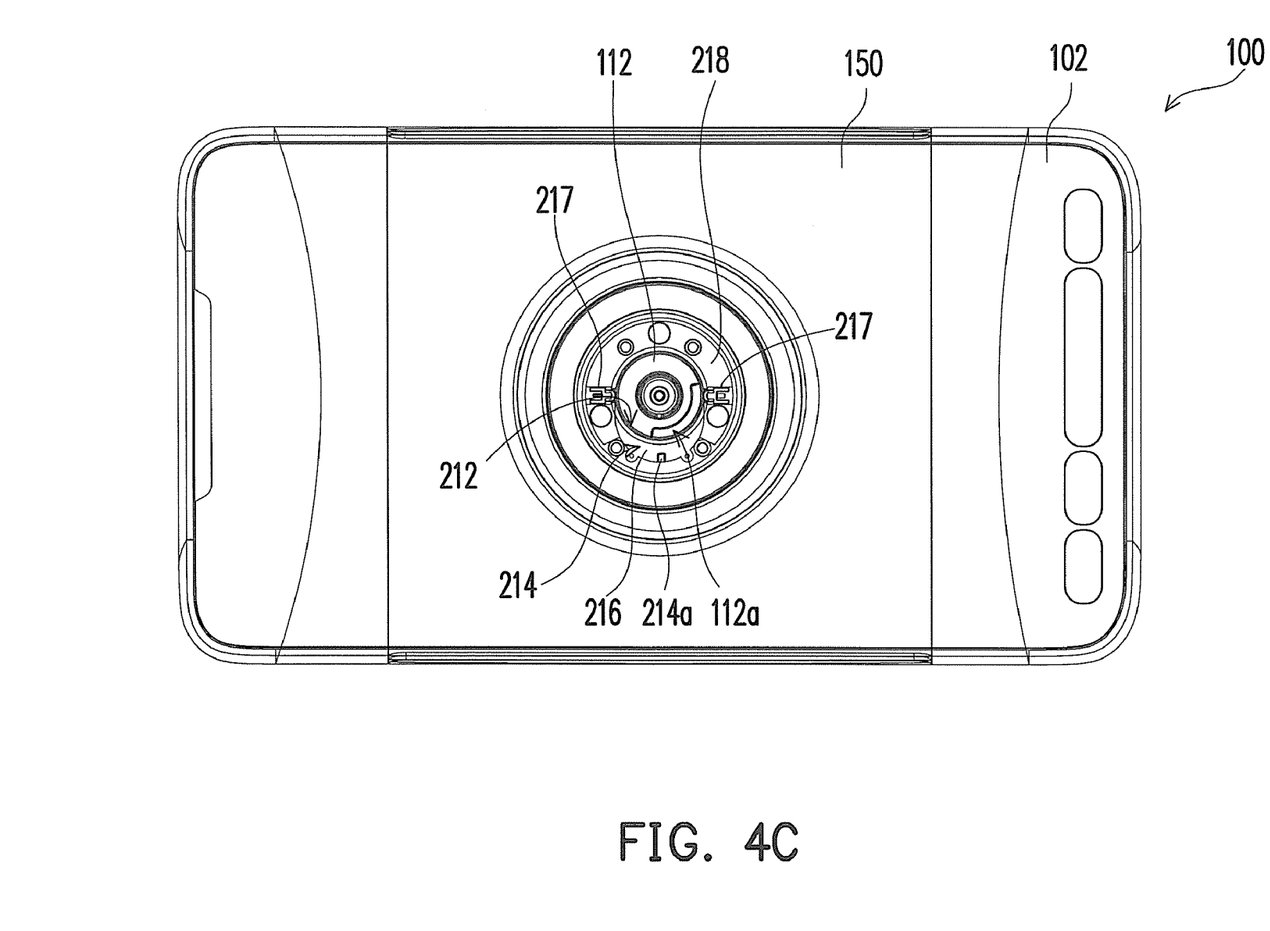
Figure 5A:
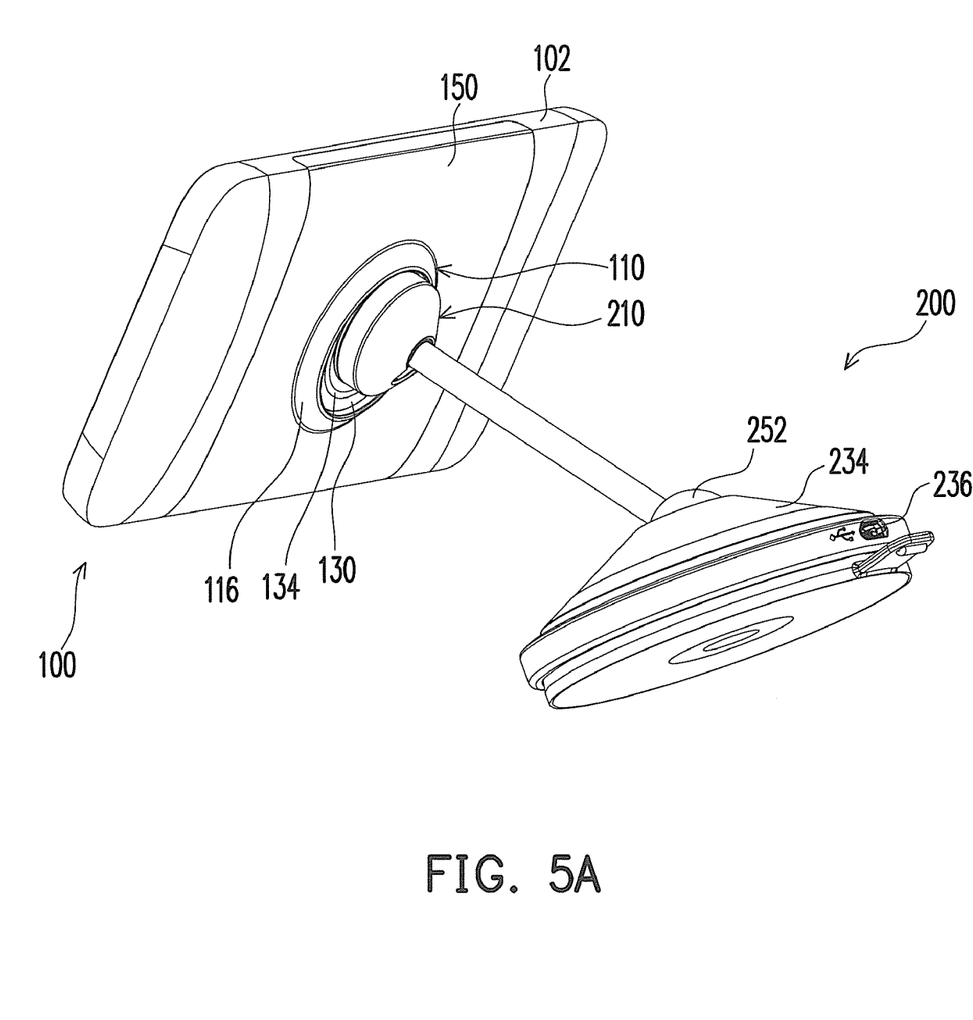
Figure 5B:
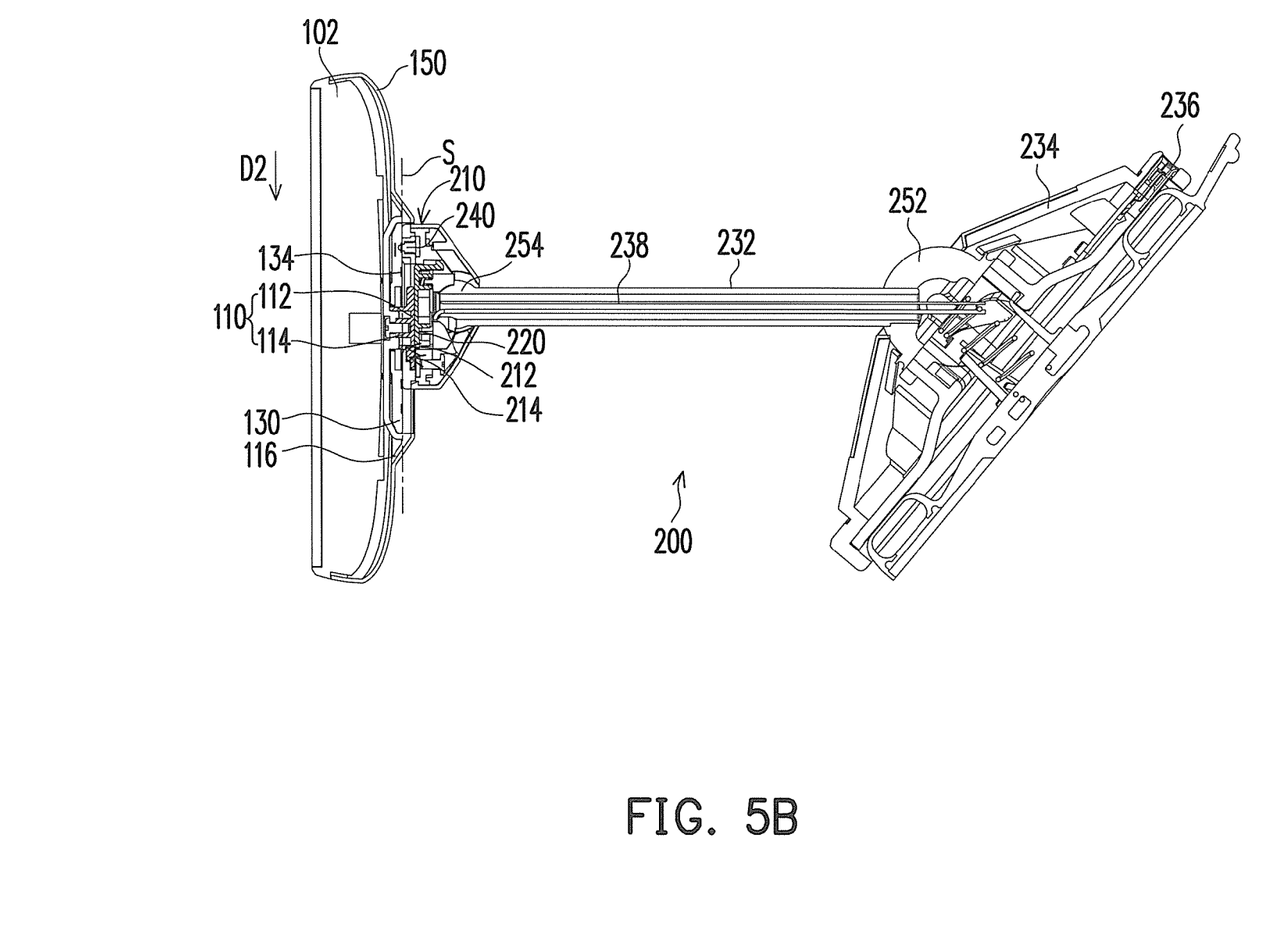
Figure 5C:
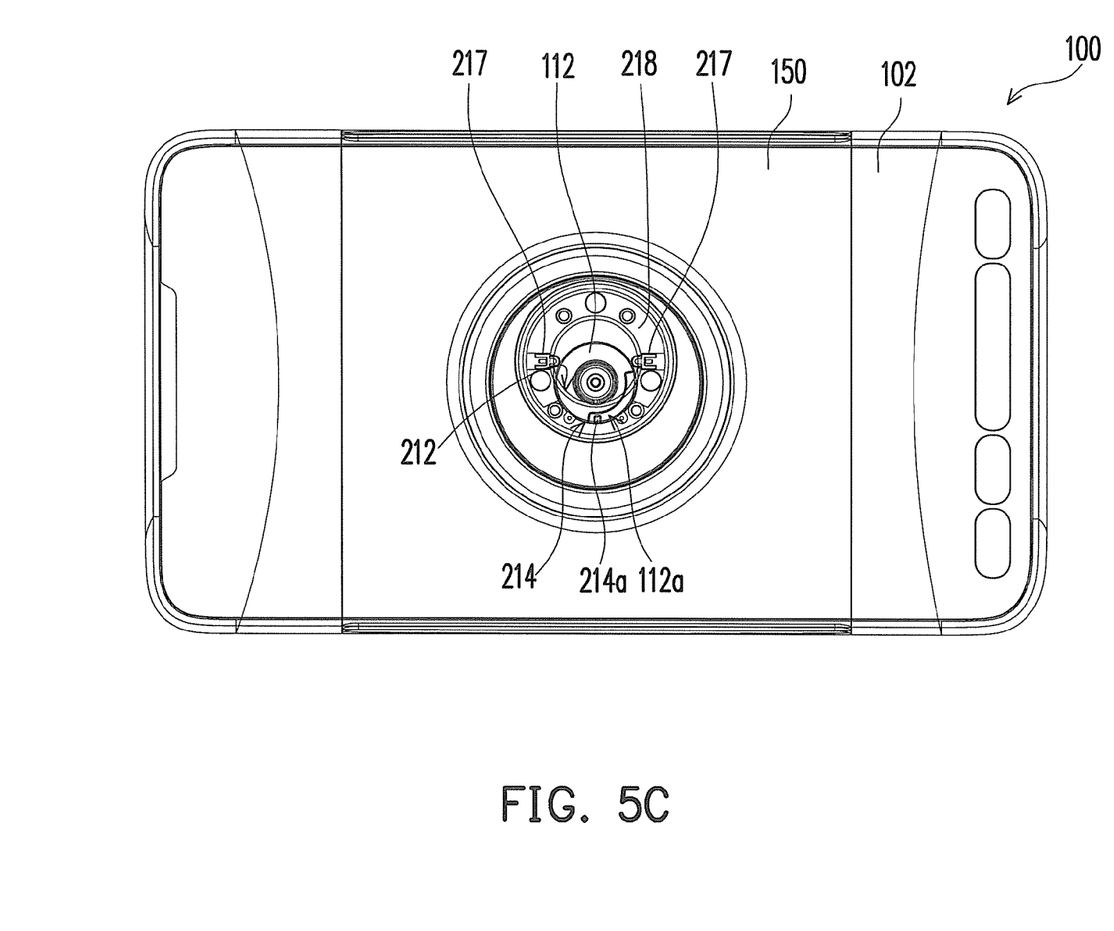
Figure 6A:
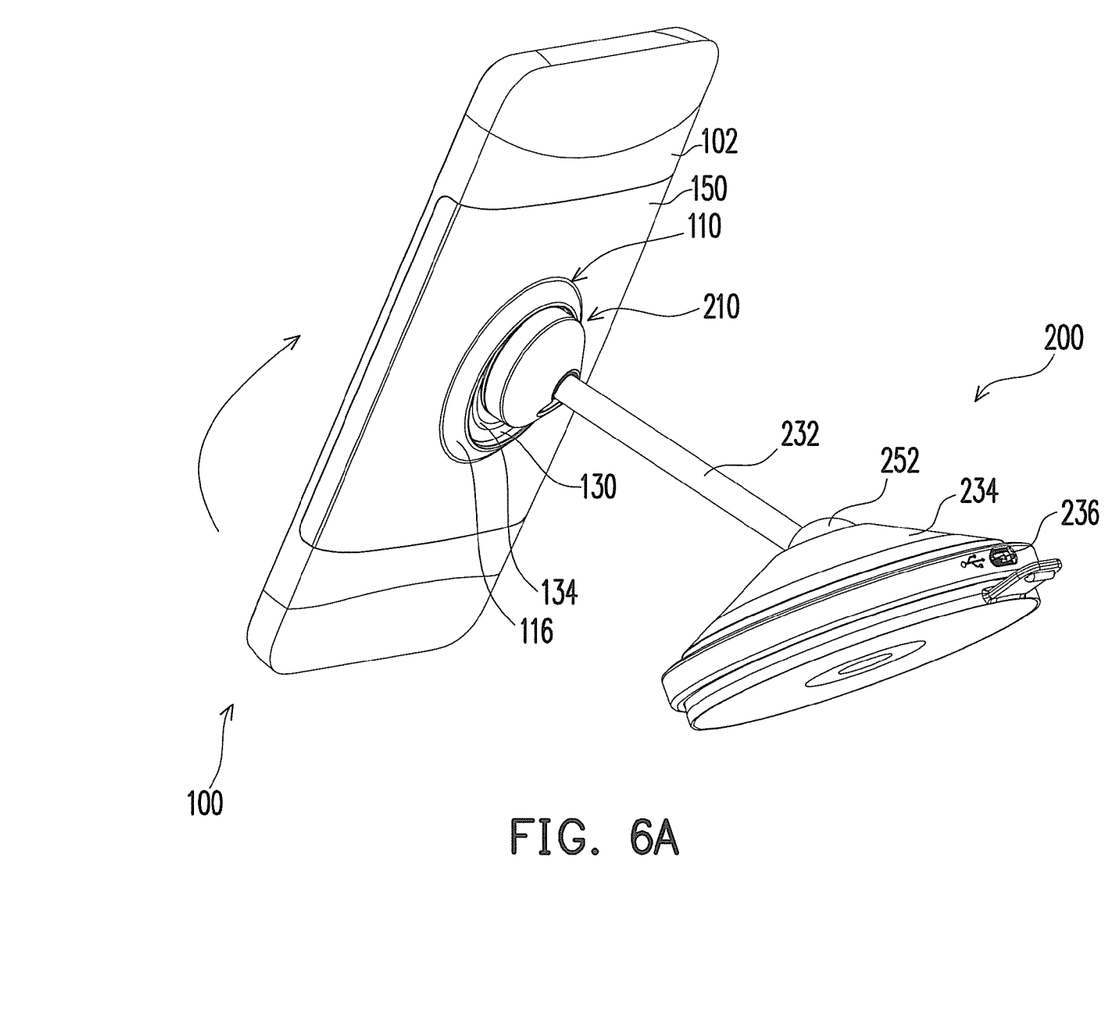
Figure 6B:
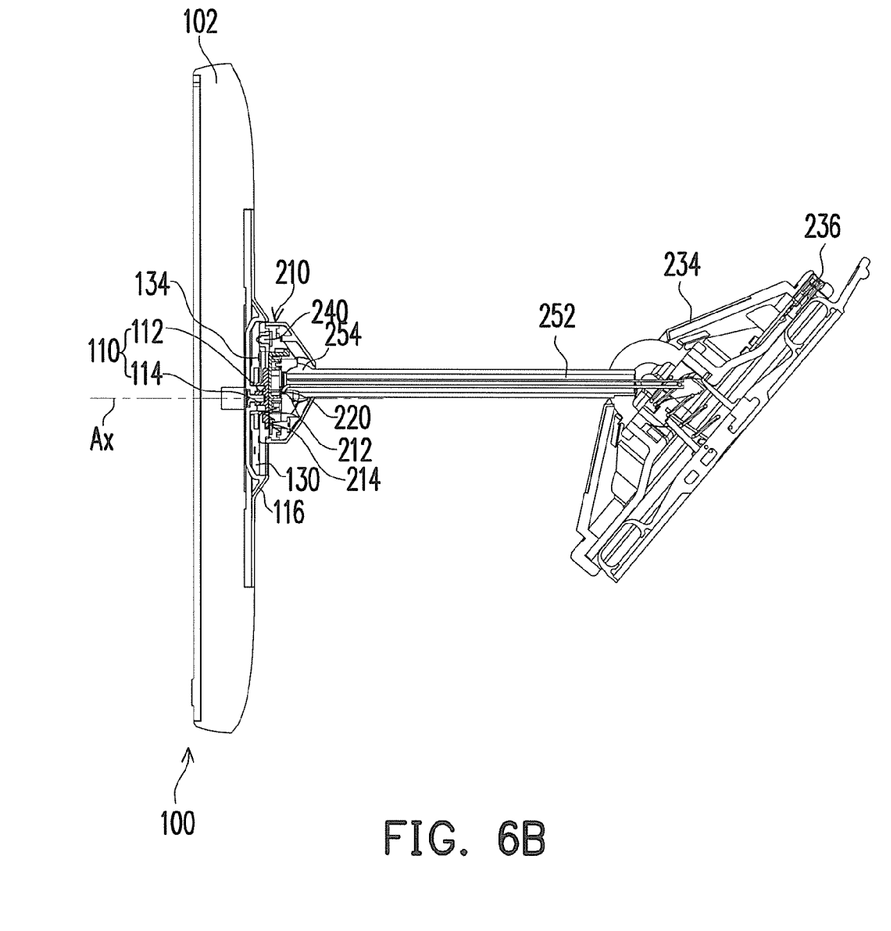
Figure 6C:
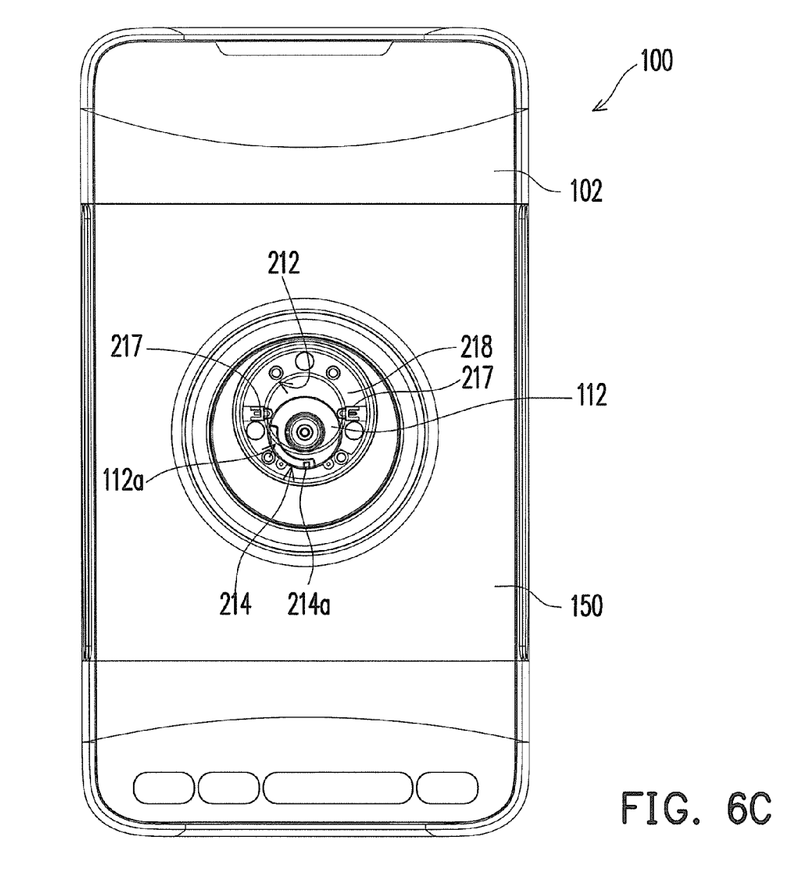

FIGS. 4 through 6 illustrate an assembling process of the handheld electronic device 100 and the holder 200, wherein FIGS. 4A, 5A and 6A are schematic views of the components in the assembling process, FIGS. 4B, 5B and 6B are cross-sectional views of the components in the assembling process, and FIGS. 4C, 5C and 6C are front views of the components in the assembling process. For a clear illustration to the relative positions of the first locking part 110 and the second locking part 210 in the assembling process, FIGS. 4C, 5C and 6C omit a part of the components.

Firstly, as shown in FIGS. 4A through 4C, the head portion 112 of the first locking part 110 passes through the assembling opening 212 of the second locking part 210 along an assembling direction D1 and then enters the assembling space 214. At the same time, the second locking part 210 pushes the first decoration plate 130 and enters the accommodating space 122 at the back side 100a of the handheld electronic device 100. Meanwhile, the second decoration plate 220 is pushed by the head portion 112 and moves along the assembling direction D1 when the head portion 112 enters the assembling space 214.

Then, as shown in FIGS. 5A through 5C, the handheld electronic device 100 along with the first locking part 110 is driven to move along an engaging direction D2 parallel to the surface S, and then the head portion 112 of the first locking part 110 reaches a locking position as shown in FIG. 5B. In this step, the locating protrusions 217 lean against the head portion 112 of the first locking part 110 and fix the head portion 112 when the head portion 112 reaches the locking position. Thereby, the handheld electronic device 100 can be reliably fixed to the second locking part 210 of the holder 200 via the first locking part 110.

However, after the above steps, users may rotate the handheld electronic device 100 to meet operating requirements. Referring to FIGS. 6A through 6C, the first locking part 110 of the handheld electronic device 100 may be rotated relative to the second locking part 210 of the holder 200 along an axis Ax parallel to the assembling direction D1. Herein, the maximum rotating angle may be restricted to 90 degrees. To achieve the restriction of the rotation angle, a guiding slot 112a can be formed on the head portion 112 of the first locking part 110, while a bump 214a corresponding to the guiding slot 112a is formed on a side wall of the assembling space 214 of the second locking part 210. The bump 214a is movably installed in the guiding slot 112a. The bump 214a enters the guiding slot 112a after the head portion 112 of the first locking part 110 reaches the locking position in the assembling space 214. The first locking part 110 is adapted to rotate relative to the second locking part 210 along the axis Ax by driving the bump 214a to move from an end of the guiding slot 112a to another end of the guiding slot 112a. In other words, the translation path of the bump 214a in the guiding slot 112a can be defined by regulating the length or the profile of the guiding slot 112a, so as to adjust the range of the rotating angle between the first locking part 110 and the second locking part 210.

The assembling process of the handheld electronic device 100 and the holder 200 is illustrated above, while the handheld electronic device can be detached from the holder 200 by reversely performing the above steps. In addition to the above embodiments, the present application also provides other implementations.

For example, the holder 200 may further provide functions of charging or transmitting data to the handheld electronic device 100 except fixing the same. Referring to FIG. 2, the first decoration plate 130 has an outer surface 130a opposite to the main body 102 of the handheld electronic device 100 and an electrode contact 134 on the outer surface 130a. The electrode contact 134 is electrically connected to the main body 102 of the handheld electronic device 100.

In addition, as shown in FIG. 3, the second locking part 210 of the holder 200 has a pogo pin 240 corresponding to the above electrode contact 134. The pogo pin 240 may be electrically connected to a power source or a signal source, and the pogo pin is adapted to be contact with the electrode contact 134 after the first locking part 110 and the second locking part 210 are joined together. The base 234 of the holder 200 may be provided with a transmission port 236 and a cable 238. The cable 238 is connected between the transmission port 236 and the pogo pin 240. Herein, the transmission port 236 may be a connecting port of universal serial bus (USB) interface or other transmission interfaces, to meet requirement of data transmission or charge.

Furthermore, referring to FIGS. 2 and 3, for aligning the handheld electronic device 100 with the holder 200, the first locking part 110 and the second locking part 210 may be respectively provided with a first magnetic component 180 and a second magnetic component 280 corresponding to each other. The first magnetic component 180 and the second magnetic component 280 may be magnets. When the first locking part 110 approaches the second locking part 210, the first magnetic component 180 and the second magnetic component 280 are adapted to be attracted with each other, such that the head portion 120 of the first locking part 110 is aligned with the assembling opening 112 and enters the assembling space 114 along the assembling direction D1 as shown in FIG. 4B.

In summary, the locking assembly of the present application has simple structure and can be applied for joining the handheld electronic device and the holder, which facilitates the minimization of the size of product and provides convenience in carrying or storing. Furthermore, the assembling process applying the locking assembly can achieve high reliability, and the users can operate the locking assembly more conveniently. The handheld electronic device and the holder applying the locking assembly can be joined with or detached from each other in much a rapid and convenient way, and the holder can fix the handheld electronic device securely.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A locking assembly for joining a first object and a second object, the locking assembly comprising:
    a first locking part located on the first object, wherein the first locking part comprises a head portion and a necking portion connected between the first object and the head portion; and
    a second locking part located on the second object, wherein the second locking part has an assembling opening and an assembling space behind the assembling opening, an area of a projection of the assembling space on a plane where the assembling opening is located is greater than and lies over the area of the assembling opening, and the head portion of the first locking part is adapted to enter the assembling space through the assembling opening along an assembling direction and then reach a locking position in the assembling space by moving along an engaging direction parallel to the surface.

2. The locking assembly as claimed in claim 1, wherein the second locking part includes a locating protrusion on a side wall of the assembling space for leaning and fixing the head portion when the head portion reaches the locking position.

3. The locking assembly as claimed in claim 1, further comprising a decoration ring disposed on the first object and surrounding the first locking part to form an accommodating space, wherein the first locking part is located in the accommodating space, and the second locking part enters the accommodating space after the head portion of the first locking part enters the assembling space through the assembling opening along the assembling direction.

4. The locking assembly as claimed in claim 3, further comprising:
    a first decoration plate disposed at an opening of the accommodating space and adapted to move along the assembling direction, the first decoration plate having a through hole exposing the head portion of the first locking part; and a first elastic component disposed between the first object and the first decoration plate.

5. The locking assembly as claimed in claim 4, wherein the first decoration plate has an outer surface opposite to the first object and an electrode contact on the outer surface, the electrode contact is electrically connected to the first object, and the locking assembly further comprises:
a pogo pin, corresponding to the electrode contact of the first decoration plate and disposed on the second locking part, wherein the pogo pin is electrically connected to a power source or a signal source, and the pogo pin is adapted to be contact with the electrode contact after the first locking part and the second locking part are joined together.

6. The locking assembly as claimed in claim 1, further comprising:
a second decoration plate disposed at the assembling opening and adapted to move along the assembling direction, wherein the head portion of the first locking part pushes the second decoration plate to move along the assembling direction when the head portion enters the assembling space through the assembling opening along the assembling direction; and
a second elastic component disposed between the second object and the second decoration plate.

7. The locking assembly as claimed in claim 2, wherein the second locking part further comprising:
a first board provided with the assembling opening thereon; and
a second board disposed in parallel with the first board to form the assembling space, wherein the locating protrusion is movably installed between the first board and the second board, and the locking assembly further comprises:
a third elastic component disposed between the locating protrusion and the first board or between the locating protrusion and the second board.

8. The locking assembly as claimed in claim 1, further comprising a first magnetic component and a second magnetic component respectively disposed on two corresponding locations of the first locking part and the second locking part, wherein the first magnetic component and the second magnetic component are adapted to be attracted with each other when the head portion of the first locking part enters the assembling space through the assembling opening along the assembling direction.

9. The locking assembly as claimed in claim 1, wherein the head portion of the first locking part has a guiding slot, the second locking part further has a bump on the side wall of the assembling space, the bump is corresponding to the guiding slot, and after the head portion of the first locking part reaches the locking position in the assembling space, the bump is movably installed in the guiding slot such that the first locking part is adapted to rotate relative to the second locking part along an axis parallel to the assembling direction by driving the bump to move from an end of the guiding slot to another end of the guiding slot.

10. An handheld electronic device suitable for being installed on a holder, wherein the holder comprises a second locking part having an assembling opening and an assembling space behind the assembling opening, an area of a projection of the assembling space on a plane where the assembling opening is located is greater and lies over the area of the assembling opening, the handheld electronic device comprising:
a first locking part disposed at a back side of the handheld electronic device, wherein the first locking part comprises a head portion and a necking portion connected between the handheld electronic device and the head portion, and the head portion of the first locking part is adapted to enter the assembling space of the second locking part through the assembling opening along an assembling direction and then reach a locking position in the assembling space by moving along an engaging direction parallel to the surface.

11. The handheld electronic device as claimed in claim 10, wherein the second locking part includes a locating protrusion on a side wall of the assembling space for leaning and fixing the head portion when the head portion reaches the locking position.

12. The handheld electronic device as claimed in claim 10, further comprising a decoration ring disposed at the back side of the handheld electronic device and surrounding the first locking part to form an accommodating space, wherein the first locking part is located in the accommodating space, and the second locking part enters the accommodating space after the head portion of the first locking part enters the assembling space through the assembling opening along the assembling direction.

13. The handheld electronic device as claimed in claim 12, further comprising:
a first decoration plate disposed at an opening of the accommodating space and adapted to move along the assembling direction, the first decoration plate having a through hole exposing the head portion of the first locking part; and
a first elastic component disposed between a main body of the handheld electronic device and the first decoration plate.

14. The handheld electronic device as claimed in claim 13, wherein the first decoration plate has an outer surface opposite to the handheld electronic device and an electrode contact on the outer surface, the electrode contact is electrically connected to the handheld electronic device.

15. The handheld electronic device as claimed in claim 10, further comprising a first magnetic component disposed on the first locking part, wherein the first magnetic component is adapted to be attracted with a second magnetic component on the holder when the head portion of the first locking part enters the assembling space through the assembling opening along the assembling direction.

16. The handheld electronic device as claimed in claim 10, wherein the head portion of the first locking part has a guiding slot, the second locking part further has a bump on the side wall of the assembling space, the bump is corresponding to the guiding slot, and after the head portion of the first locking part reaches the locking position in the assembling space, the bump is movably installed in the guiding slot such that the first locking part is adapted to rotate relative to the second locking part along an axis parallel to the assembling direction by driving the bump to move from an end of the guiding slot to another end of the guiding slot.

17. A holder suitable for carrying a handheld electronic device, wherein the handheld electronic device comprises a first locking part disposed at a back side of the handheld electronic device, and the first locking part comprises a head portion and a necking portion connected between the handheld electronic device and the head portion, the holder comprising:
a second locking part having an assembling opening and an assembling space behind the assembling opening, wherein an area of a projection of the assembling space on a plane where the assembling opening is located is greater than and lies over the area of the assembling opening, and the head portion of the first locking part is adapted to enter the assembling space through the assembling opening along an assembling direction and then reach a locking position in the assembling space by moving along an engaging direction parallel to the surface.

18. The holder as claimed in claim 17, wherein the second locking part includes a locating protrusion on a side wall of the assembling space for leaning and fixing the head portion when the head portion reaches the locking position.

19. The holder as claimed in claim 17, further comprising:
a pogo pin, corresponding to an electrode contact on the handheld electronic device and disposed on the second locking part, wherein the pogo pin is electrically connected to a power source or a signal source, and the pogo pin is adapted to be contact with the electrode contact after the first locking part and the second locking part are joined together;
a transmission port; and
a cable, connected between the transmission port and the pogo pin.

20. The holder as claimed in claim 17, further comprising:
a second decoration plate disposed at the assembling opening and adapted to move along the assembling direction, wherein the head portion of the first locking part pushes the second decoration plate to move along the assembling direction when the head portion enters the assembling space through the assembling opening along the assembling direction; and
a second elastic component disposed between the second locking part and the second decoration plate.

21. The holder as claimed in claim 18, wherein the second locking part comprises:
a first board provided with the assembling opening thereon; and
a second board disposed in parallel with the first board to form the assembling space, wherein the locating protrusion is movably installed between the first board and the second board, and the holder further comprises:
a third elastic component disposed between the locating protrusion and the first board or between the locating protrusion and the second board.

22. The holder as claimed in claim 17, further comprising a second magnetic component disposed on the second locking part, wherein the second magnetic component is adapted to be attracted with a first magnetic component on the handheld electronic device when the head portion of the first locking part enters the assembling space through the assembling opening along the assembling direction.

23. The holder as claimed in claim 17, wherein the head portion of the first locking part has a guiding slot, the second locking part further has a bump on the side wall of the assembling space, the bump is corresponding to the guiding slot, and after the head portion of the first locking part reaches the locking position in the assembling space, the bump is movably installed in the guiding slot such that the first locking part is adapted to rotate relative to the second locking part along an axis parallel to the assembling direction by driving the bump to move from an end of the guiding slot to another end of the guiding slot.

* * * * *